United States Patent
Mercante et al.

(10) Patent No.: US 12,345,968 B2
(45) Date of Patent: Jul. 1, 2025

(54) LITHIUM NIOBATE ON INSULATOR (LNOI) VERTICALLY TAPERED OPTICAL WAVEGUIDE AND METHOD OF FORMING THE SAME

(71) Applicant: Phase Sensitive Innovations, Inc., Newark, DE (US)

(72) Inventors: Andrew Mercante, Newark, DE (US); Peng Yao, Newark, DE (US); Dennis Prather, Newark, DE (US)

(73) Assignee: Phase Sensitive Innovations, Inc., Newark, DE (US)

( * ) Notice: Subject to any disclaimer, the term of this patent is extended or adjusted under 35 U.S.C. 154(b) by 80 days.

(21) Appl. No.: 17/869,030

(22) Filed: Jul. 20, 2022

(65) Prior Publication Data
US 2024/0027798 A1    Jan. 25, 2024

(51) Int. Cl.
*G02B 6/12*   (2006.01)
*G02F 1/035*  (2006.01)

(52) U.S. Cl.
CPC ...... *G02F 1/035* (2013.01); *G02B 2006/1204* (2013.01)

(58) Field of Classification Search
CPC ........ G02B 2006/1204; G02B 6/12016; G02B 6/1228
See application file for complete search history.

(56) References Cited

U.S. PATENT DOCUMENTS

| 6,813,432 B2 | 11/2004 | Salib | |
| 2003/0044118 A1* | 3/2003 | Zhou | G02B 6/14 385/28 |
| 2009/0116802 A1* | 5/2009 | Kondou | G02B 6/1228 264/1.27 |
| 2018/0314004 A1* | 11/2018 | Fathpour | G02B 6/1228 |

FOREIGN PATENT DOCUMENTS

| JP | S61-73908 A | † | 4/1986 |
| JP | 2022099500 A | † | 7/2022 |

OTHER PUBLICATIONS

Ahmed et al., Vertical mode transition in hybrid lithium niobate and silicon nitride-based photonic integrated circuit structures, Optics Letters vol. 43, Issue 17, pp. 4140-4143 (Year: 2018).*

Moerman et al. "A Review on Fabrication Technologies for the Monolithic Integration of Tapers with III-V Semiconductor Devices", p. 1-13, IEEE Journals of Selected Topics in Quantum Electronics, vol. 3, No. 6, Dec. 1997.†

\* cited by examiner
† cited by third party

*Primary Examiner* — Charlie Y Peng
(74) *Attorney, Agent, or Firm* — Muir Patent Law, PLLC (57) ABSTRACT

A lithium niobate on insulator (LNOI) optical waveguide including a first region, a second region, and a third region, a substrate layer extending across the first region, the second region, and the third region, and a first cladding layer disposed on the substrate layer across the first region, the second region, and the third region. The LNOI optical waveguide further includes a lithium niobate (LN) layer (Continued)

disposed on the first cladding layer across the first region and the second region. The LN layer has a planar surface in the first region and a vertically tapered surface in the second region, and a dielectric strip in contact with the LN layer across the first region and the second region, and in contact with the first cladding layer across the third region.

18 Claims, 10 Drawing Sheets

LITHIUM NIOBATE ON INSULATOR (LNOI) VERTICALLY TAPERED OPTICAL WAVEGUIDE AND METHOD OF FORMING THE SAME

GOVERNMENT SUPPORT

The subject matter herein disclosed was made with partial government funding and support under government contract number N00173-20-C-2003 awarded by the National Research Laboratory. The government has certain rights in the invention.

BACKGROUND

Aspects of the present inventive concept relate to a Lithium Niobate on Insulator (LNOI) optical waveguide, and more particularly, to a LNOI optical waveguide having a tapered coupling region.

Optical devices may be integrated to form photonic integrated circuits (PICs). The optical devices may include, for example, optical waveguides. Optical waveguides may be used to guide light to and from the different optical devices within a PIC or to guide light to and from optical devices external to a PIC. Various optical devices, such as switches, wavelength multiplexers, and modulators may be implemented using optical waveguides. In the specific implementation of a modulator, for example, the modulation properties of the optical waveguide is dependent on the properties of the substrate (e.g., the refractive index of the substrate). Due in part to the high-performance electro-optic effect, high intrinsic $2^{nd}$ and $3^{rd}$ order nonlinearities, and high optical transparency (350 nm to 5500 nm) of lithium niobate (LiNbO3, LN), thin film lithium niobate on insulator (LNOI) wafer technology is increasingly being used to fabricate optical devices.

To guide light to the different optical devices, optical waveguides may be physically coupled to the different optical devices. Coupling efficiency is expressed as the ratio of the optical power transferred to a second optical device to the input power from a first optical device. Coupling efficiency may be decreased, for example, when there is a mismatch in size between the exit facet of the first optical device and the entrance facet of the second optical device. For example, when coupling optical devices, such as an optical waveguide to an optical fiber, there may be a great mismatch between the size of the coupling facet of the optical waveguide and the core diameter of the optical fiber. Such a mismatch in size results in a low coupling efficiency. One approach to achieving high coupling efficiency between the optical devices is to taper the coupling facet of the optical waveguide for improved size matching in the facets of the optical devices. However, challenges exist in microstructuring LNOI optical waveguides to produce the tapered waveguide structures that allow for high coupling efficiency.

SUMMARY

The exemplary embodiments of the disclosure provide a method of fabricating a LNOI optical waveguide having a tapered coupling region that allows for high coupling efficiency.

According to aspects of the inventive concept, there is provided a lithium niobate on insulator (LNOI) optical waveguide comprising a first region, a second region, and a third region; a substrate layer extending across the first region, the second region, and the third region; a first cladding layer disposed on the substrate layer across the first region, the second region, and the third region; a lithium niobate (LN) layer disposed on the first cladding layer across the first region and the second region, wherein the LN layer has a planar surface in the first region and a vertically tapered surface in the second region; and a dielectric strip in contact with the LN layer across the first region and the second region, and in contact with the first cladding layer across the third region.

According to aspects of the inventive concept, there is provided a method of forming a lithium niobate on insulator (LNOI) optical waveguide. The method comprising depositing a first mask on a first region of a lithium niobate (LN) layer of an LNOI wafer extending in a first direction and a second direction perpendicular to the first direction, the LNOI wafer including a first cladding layer and the LN layer disposed on the first cladding layer in a third direction perpendicular to the first direction and the second direction; polishing, using a chemical mechanical polishing process, the LNOI wafer until at least a part of the LN layer is removed from a second region of the LNOI wafer, and in a third region, between the first region and the second region, a vertically tapered surface of the LN layer is formed; and removing the first mask

BRIEF DESCRIPTION OF THE DRAWINGS

The above and other objects, features, and advantages of the inventive concept will become more apparent to those skilled in the art upon consideration of the following detailed description with reference to the accompanying drawings.

DETAILED DESCRIPTION OF EXEMPLARY EMBODIMENTS

Various aspects of the inventive concept will be described more fully hereinafter with reference to the accompanying drawings.

Figures 1A, 1B:
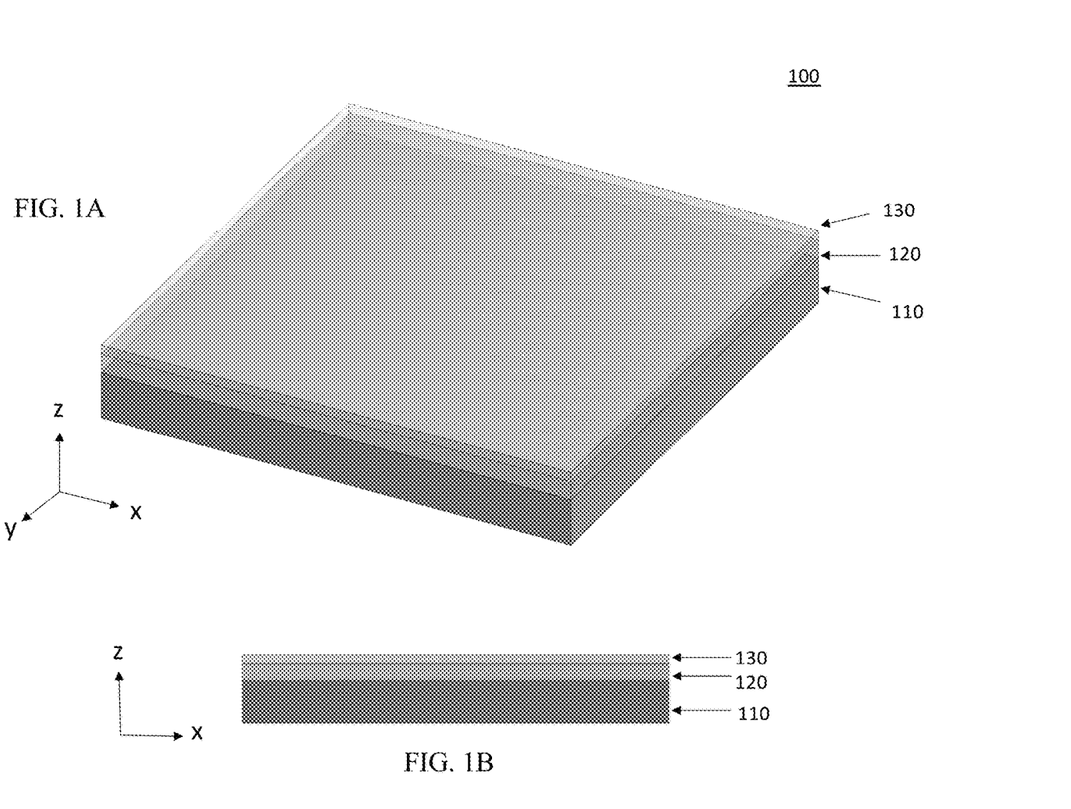
FIGS. 1A and 1B illustrate isometric and side views of a LNOI wafer.

FIG. 1A illustrates an isometric view and FIG. 1B illustrates a side view of an example of a conventional lithium niobate on insulator (LNOI) wafer 100. The LNOI wafer 100 comprises a substrate layer 110 extending in a first direction (x-direction) and a second direction (y-direction) perpendicular to the first direction. The LNOI wafer 100 further comprises a cladding layer 120 in contact with and disposed on the substrate layer 110 in a third direction (z-direction) perpendicular to the first and second directions, and a thin (i.e., submicrometer-thick) film layer of lithium niobate (LN) 130 disposed on and in contact with the cladding layer 120 in the third direction. The substrate layer 110 may be formed of LN, silicon, quartz, fused silica, or sapphire. The cladding layer 120, having a lower refractive index than LN, may be formed of silicon oxide (SiO2). In the LNOI wafer 100, the substrate layer 110 may have a thickness within a range of about 500 µm to 1,000 µm, the cladding layer 120 may have a thickness within a range of about 2 µm to 5 µm, and the LN layer 130 may have a thickness within a range of about 0.3 µm to 0.7 µm. Terms such as "about" or "approximately" may reflect amounts, sizes, orientations, or layouts that vary only in a small relative manner, and/or in a way that does not significantly alter the operation, functionality, or structure of certain elements. For example, a range from "about 0.1 to about 1" may encompass a range such as a 0%-5% deviation around 0.1 and a 0% to 5% deviation around 1, especially if such deviation maintains the same effect as the listed range.

FIGS. 2A, 2B, 3A, 3B, 4A, 4B, 5A, 5B, 6A-6D, 7A, and 7B, illustrate aspects of forming an LNOI optical waveguide having a tapered coupling region using an LNOI wafer, similarly to the LNOI wafer 100, in accordance with an example embodiment of the inventive concept. As is understood in the art, multiple and varying optical devices (e.g., optical waveguides) may be formed on different sections of the LNOI wafer. However, for simplicity and ease of understanding, only a subsection of the LNOI wafer is illustrated to describe in detail the formation of an LNOI optical waveguide having a tapered coupling region.

Figure 2A:
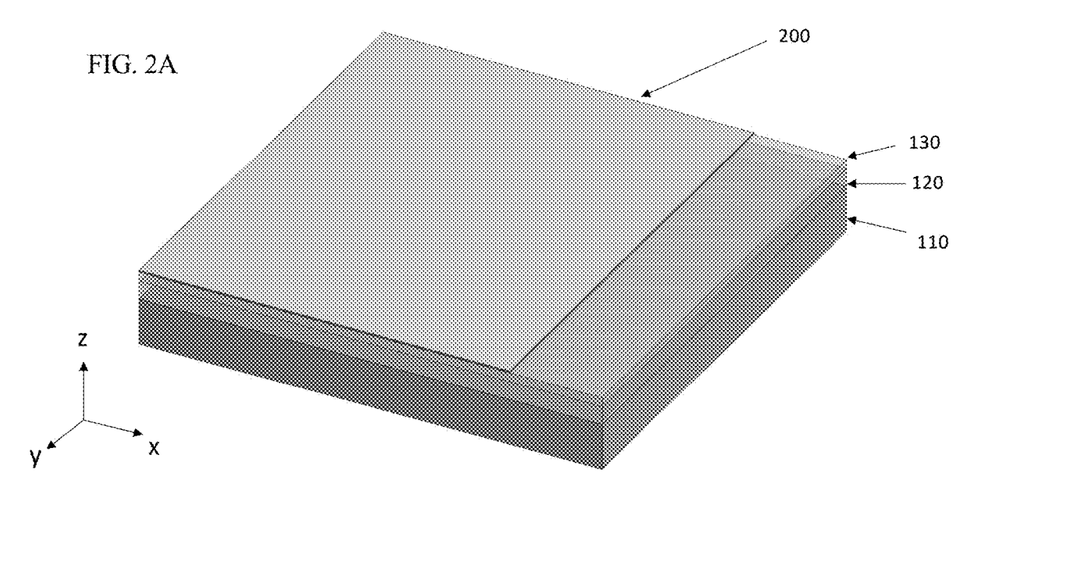
FIGS. 2A and 2B illustrate isometric and side views showing a method of fabricating a LNOI optical waveguide according to an example embodiment of the inventive concept.
Figure 2B:
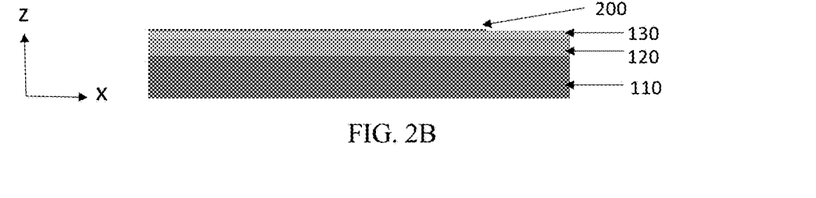

FIG. 2A illustrates an isometric view and FIG. 2B illustrates a side view of the LNOI wafer having a hard mask 200 formed thereon. As illustrated in FIGS. 2A and 2B, a hard mask 200 may be formed on the LNOI wafer to protect a portion of the LNOI wafer while an unprotected portion of the LNOI wafer is thinned. The hard mask 200 may include one or more materials such as chromium (Cr). The hard mask material may be blanket deposited on the LNOI wafer through known deposition methods (e.g., physical vapor deposition (PVD) methods) and patterned to form the hard mask 200 (e.g., via femtosecond laser ablation or selectively etched via a patterned photoresist layer formed thereon).

Figure 3A:
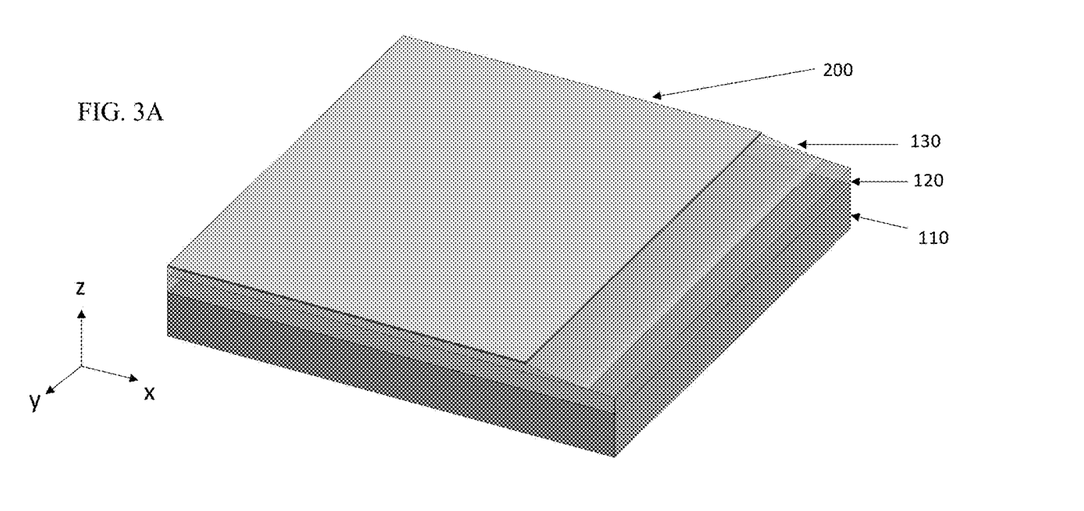
FIGS. 3A and 3B illustrate isometric and side views showing a method of fabricating a LNOI optical waveguide according to an example embodiment of the inventive concept.
Figure 3B:
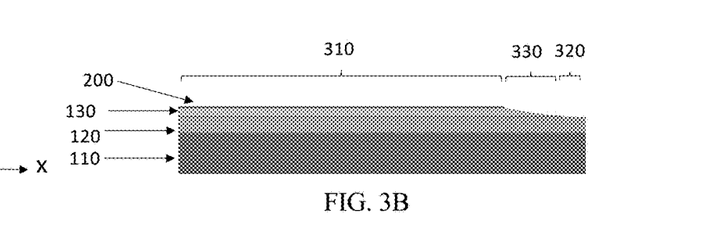

As shown in FIGS. 3A and 3B, subsequent to forming the hard mask 200, the unprotected portion of the LNOI wafer that is exposed (i.e., not covered) by the hard mask 200 is subjected to polishing. The polishing process may be a conventional semiconductor planarization process, such as a chemical mechanical polishing (CMP) process. The portion of the LN layer 130 under the hard mask 200 is protected from the polishing by the hard mask 200 and is not removed, whereas the portion exposed by the hard mask 200 (i.e., the portion of the LN layer 130 not covered by the hard mask 200) is subject to polishing and is removed at least partly by the polishing.

As illustrated in FIGS. 3A and 3B, as a result of the polishing process, the resulting LN layer 130 does not have a uniform thickness. For example, the polishing process results in three distinct regions on the surface of the LNOI wafer. The first region, referred to herein as an interaction region 310, is the region of the LNOI wafer that was covered by the hard mask 200 during the polishing process. As a result, the LN layer 130 in the interaction region 310 that was not thinned during the polishing process, has a planar upper surface and a planar lower surface, and has a constant thickness greater than the thickness of the LN layer 130 in the other regions across the LNOI wafer. The interaction region 310 may be utilized as, for example, the interaction region of an electro-optic modulator. The second region, referred to herein as a coupler region 320, is a region of the LNOI wafer in which the LN layer 130 has been completely removed by the polishing process to expose the cladding layer 120. The third region, referred to herein as a transition region 330, is formed between the interaction region 310 and the coupler region 320. The transition region 330 is formed of a smooth tapered portion of the LN layer 130. The coupler region 320 may form one or more optical connectors (e.g., optical ports) to connect the optical device to an external optical waveguide, such as an optical fiber, and thereby provide optical communication between the interaction region 310 and the external optical waveguide via the transition region 330. Ordinal numbers such as "first," "second," "third," etc. may be used simply as labels of certain elements, steps, etc., to distinguish such elements, steps, etc. from one another. Terms that are not described using "first," "second," etc., in the specification, may still be referred to as "first" or "second" in a claim. In addition, a term that is referenced with a particular ordinal number (e.g., "first" in a particular claim) may be described elsewhere with a different ordinal number (e.g., "second" in the specification or another claim).

Although often intended to provide a planarized surface, the polishing process may cause "dishing" in the softer LN material adjacent the relatively harder material of the hard mask material. For the LN layer 130 not covered by the hard mask 200 and adjacent to the hard mask 200, the rate of removal during the polishing process may be lower (slowed) corresponding to (i.e., as a function of) the distance of the exposed LN layer 130 from the hard mask 200. For example, portions of the exposed LN layer 130 closer to the hard mask 200 may be removed at a lower rate than portions of the exposed LN layer 130 further away from the hard mask 200 (in the x-direction). Thus, between the interaction region 310 and the coupler region 320, the polishing process may result in a tapered LN material gradually thinning from the interaction region 310 to the coupler region 320 to thereby provide the transition region 330 between the interaction region 310 and the coupler region 320. Accordingly, the LN layer 130 may be vertically tapered, and thus have a vertically tapered surface, in the transition region 330. The vertically tapered surface of the transition region 330, having been subject to the polishing process, may be smooth. For example, surface roughness of the transition region 330 may be less than 20 nm Ra, such as less than 15 nm Ra, or about 10 nm Ra or less.

Figure 4A:
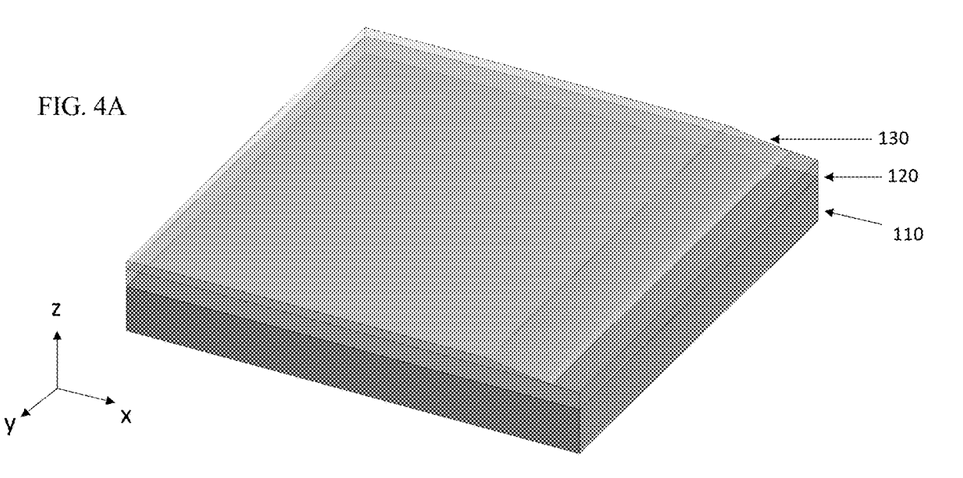
FIGS. 4A and 4B illustrate isometric and side views showing a method of fabricating a LNOI optical waveguide according to an example embodiment of the inventive concept.
Figure 4B:
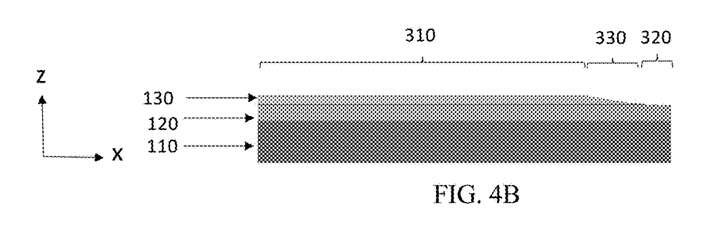

FIGS. 4A and 4B illustrate, respectively, an isometric view and a side view of the LNOI wafer subsequent to the removal of the hard mask 200. The hard mask 200 may be removed, for example, via etching. For example, the hard mask 200 may be removed using a wet etch process using a hard mask 200 etching solution (e.g., Cr etching solution). It may also be possible to remove the hard mask 200 using a dry etch process (e.g., plasma etch).

Figure 5A:
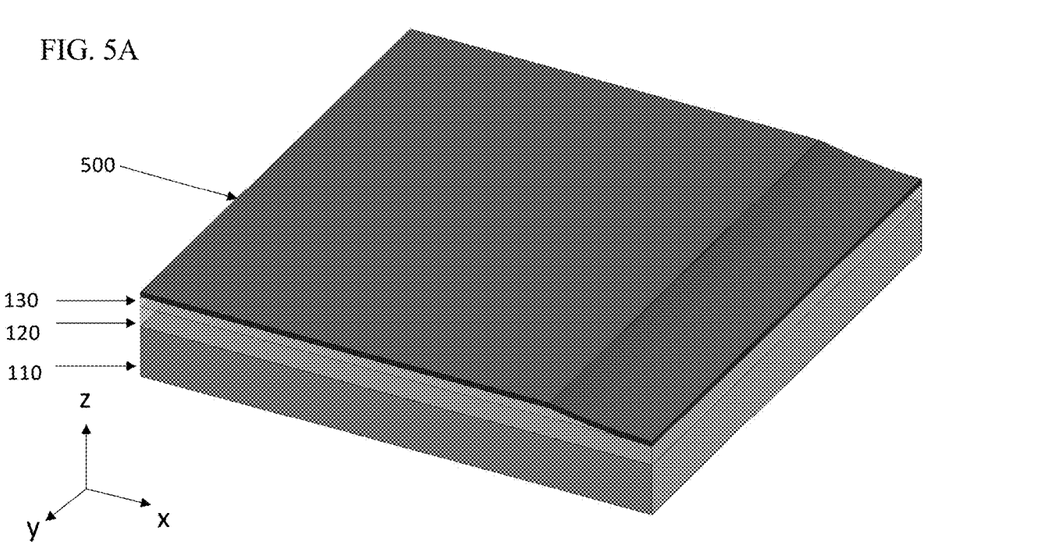
FIGS. 5A and 5B illustrate isometric and side views showing a method of fabricating a LNOI optical waveguide according to an example embodiment of the inventive concept.
Figure 5B:
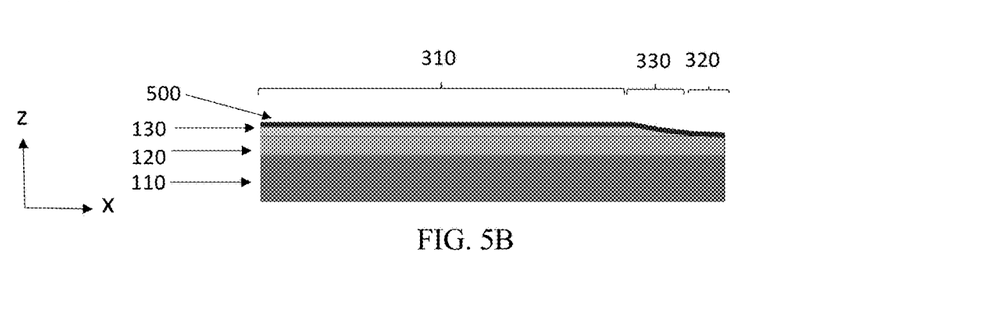

FIGS. 5A and 5B illustrate, respectively, an isometric view and a side view of the LNOI wafer subsequent to the deposition of a loading dielectric layer 500. The loading dielectric layer 500 may be formed of a material having a higher optical refractive index than the surrounding air or of another material that may be subsequently formed on top of the loading dielectric layer 500 (i.e., an upper cladding material), but lower than the optical refractive index of LN. For example, the loading dielectric layer 500 may be formed from a material, such as silicon nitride ($Si_3N_4$), titanium oxide ($TiO_2$), and silicon (Si). Thus, the order of the materials in accordance with their respective optical refractive index (highest to lowest) is LN, the material forming the loading dielectric layer 500, other cladding materials (e.g., air, or other upper cladding material, $SiO_2$ or other lower cladding material). The loading dielectric layer 500 may be blanketed deposited (e.g., via sputtering) to cover the entire surface of the LNOI wafer, including across the interaction region 310, the transition region 330, and the coupler region 320 such that the loading dielectric layer 500 contacts the planar upper surface of the LN layer 130 in the interaction region 310, the vertically tapered surface of the LN layer 130 in the transition region 330, and the cladding layer 120 in the coupler region 320.

Figure 6A:
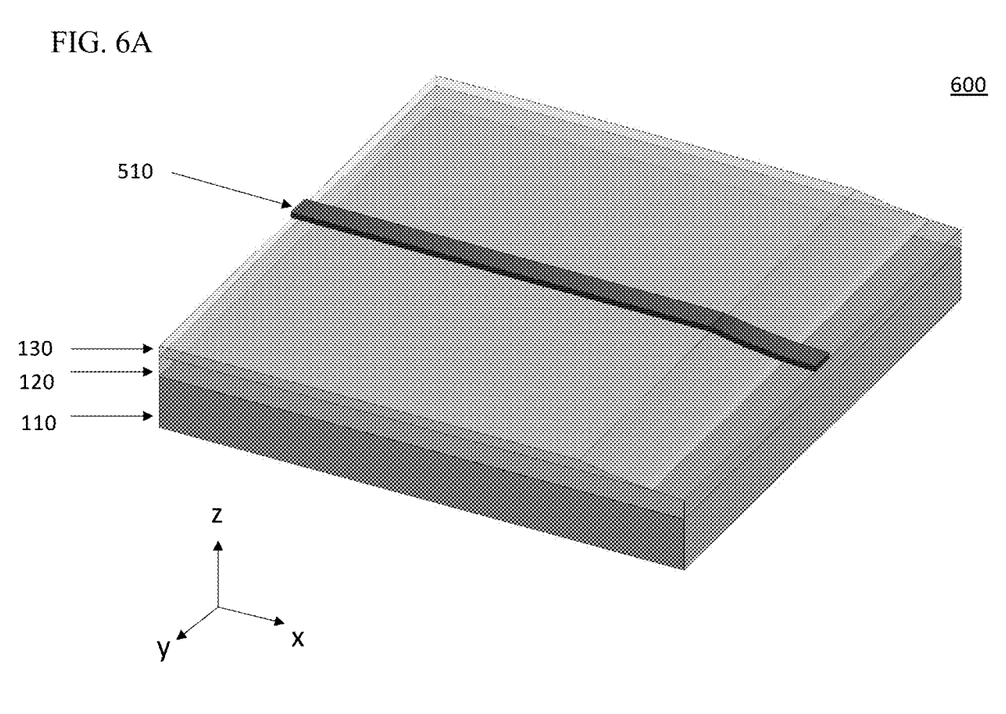
FIGS. 6A and 6D illustrate isometric, side, and cross-sectional views showing a method of fabricating a LNOI optical waveguide according to an example embodiment of the inventive concept.

FIGS. 6A-6D illustrate, respectively, an isometric view, a side view, and cross-sectional views showing a LNOI optical waveguide 600 according to an example embodiment of the present inventive concept. As illustrated in FIG. 6A, the loading dielectric layer 500 has been patterned to form a dielectric strip 510. The dielectric strip 510 is in contact with the LN layer 130 across the interaction region 310 and the transition region 330, and is in contact with the cladding layer 120 across the coupler region 320. As an example, the dielectric strip 510 may be formed by depositing a mask on the loading dielectric layer 500 via know deposition methods and it may be patterned via a patterned photoresist layer formed thereon.

Figure 6B:
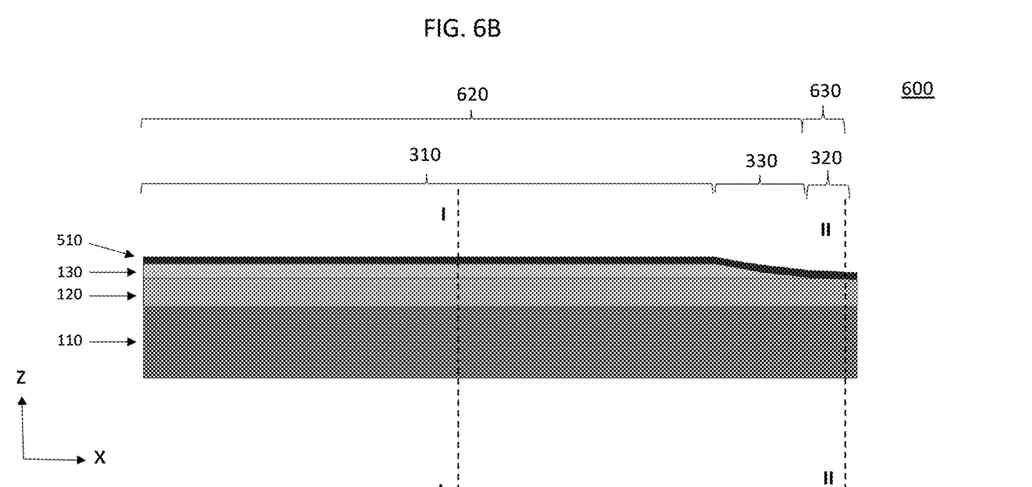

As illustrated in FIG. 6B, the LNOI optical waveguide 600 comprises two different types of waveguides corresponding to the distinct regions of the LNOI optical waveguide 600 and thus, the LNOI optical waveguide 600 may be referred to as a hybrid waveguide. For example, as illustrated in the cross-sectional view taken along line I-I of FIG. 6C, along the interaction region 310 and the transition region 330, the LNOI optical waveguide 600 comprises a strip-loaded waveguide 620 (i.e., a first optical waveguide) that includes the dielectric strip 510 (i.e., the material forming the dielectric strip 510), the LN layer 130 (i.e., the material forming the LN layer 130), and the cladding layer 120 (i.e., the material forming the cladding layer 120). The waveguide core of the strip-loaded waveguide 620 is formed by the LN layer 130, with the thickness of the waveguide core being defined by the thickness of the LN layer 130 in the z-direction and the width of the waveguide core being defined by the width of the dielectric strip 510 in the y-direction. As illustrated in the cross-sectional view taken along line II-II of FIG. 6D, along the coupler region 320, the LNOI optical waveguide 600 also comprises a ridge waveguide 630 (i.e., a second optical waveguide) that includes the dielectric strip 510 (i.e., the material forming the dielectric strip 510) and the cladding layer 120 (i.e., the material forming the cladding layer 120). The waveguide core of the ridge waveguide 630 is formed by the dielectric strip 510. The waveguide core of the strip-loaded waveguide 620 and the waveguide core of the ridge waveguide 630 are configured to confine light via total internal reflection (TIR) and guide the light in a direction (i.e., x-direction) that traverses the interaction region 310, the transition region 330, and the coupler region 320 sequentially (i.e., from the interaction region 310 to the coupler region 320 via the transistion region 330, or in the opposite direction, from the coupler region 320 to the interaction region 310 via the transition region 330).

Figure 7A:
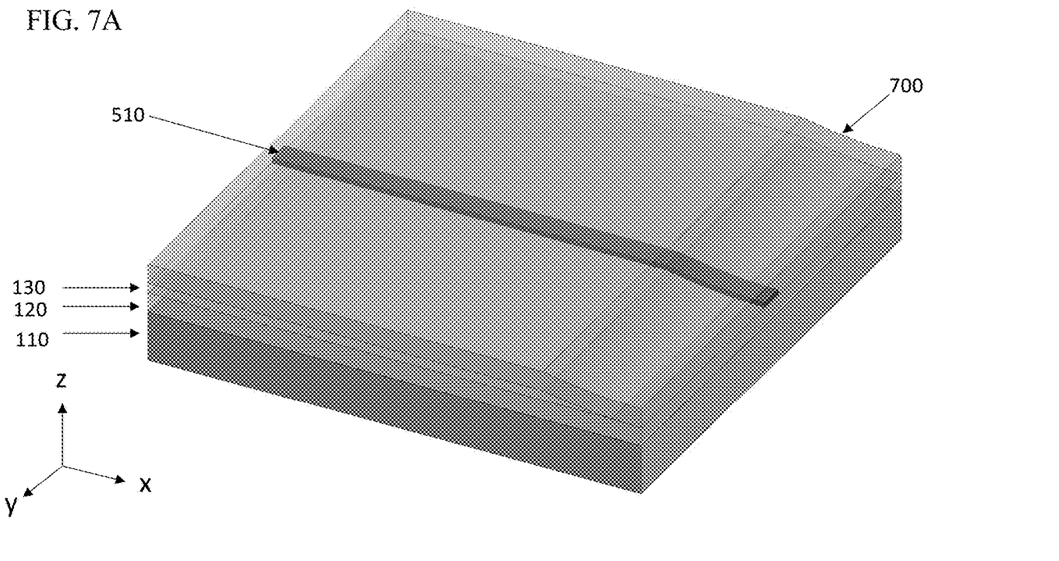
FIGS. 7A and 7B illustrate isometric and side views showing a method of fabricating a LNOI optical waveguide according to an example embodiment of the inventive concept.
Figure 7B:
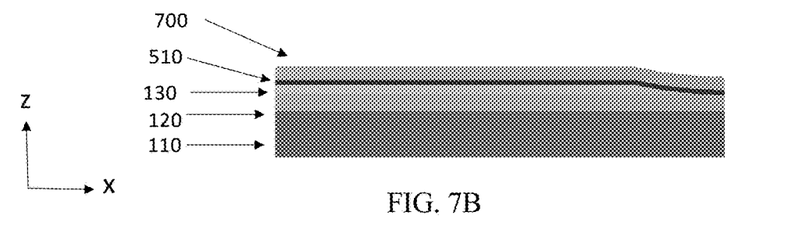

As illustrated in FIGS. 7A and 7B, an optional upper cladding layer 700 may be deposited on the LNOI optical waveguide 600. The upper cladding layer 700 may cover and may contact the dielectric strip 610. As discussed above, the upper cladding layer 700 has an optical refractive index lower than the optical refractive index of the material forming the dielectric strip 610. For example, similar to the cladding layer 120, the upper cladding layer 700 may also be formed of silicon oxide ($SiO_2$).

Figure 6C:
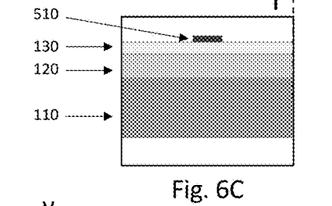
Figure 6D:
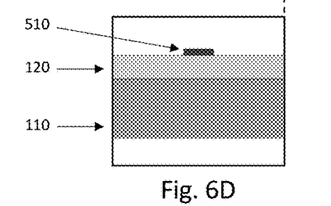

Referring back to FIGS. 6A-6D, exemplary dimensions with respect to the LNOI optical waveguide 600 are described in further detail. The thickness of the dielectric strip 510 may have a value selected from a range between 0.05 μm to 0.2 μm. Referring to FIGS. 6C, in the strip-loaded waveguide 620 the thickness of the LN layer 130 may range from approximately 0.1 μm to 0.7 μm.

In the LNOI optical waveguide 600, the coupler region 320 may couple to an optical fiber or other external waveguide thereby coupling the optical fiber or the other external waveguide to the interaction region 310 (together with the transition region 330). For example, the core of the optical fiber may be positioned to align (e.g., contact) with the core of the waveguide formed in the waveguide coupler region 320.

Figure 8:
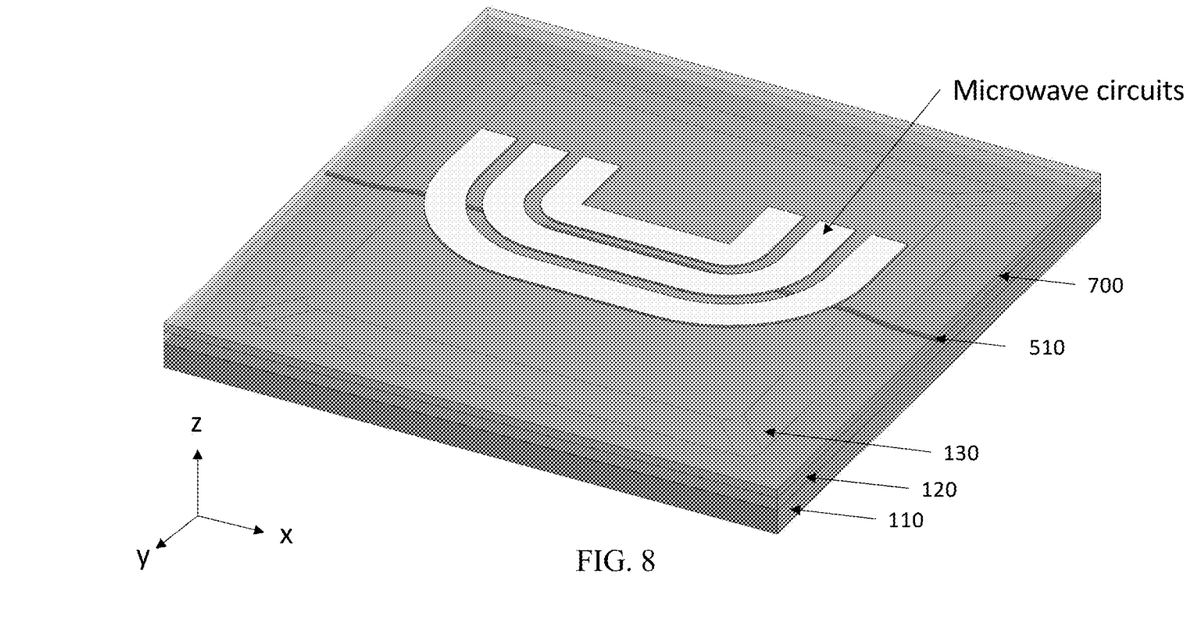
FIG. 8 illustrates an integrated LNOI photonic chip according to an example embodiment of the inventive concept.

FIG. 8 illustrates an integrated LNOI photonic circuit (chip) formed using the LNOI optical waveguide 600 disclosed herein. As an example, the integrated LNOI photonic chip may be used in applications, such as optical communications and microwave photonics. The LNOI photonic chip may include electrodes/contacts spaced in relation to the different regions of the LNOI optical waveguide 600 to form one or more circuits. The electrodes/contacts may be formed of, or include, gold, aluminum, copper, titanium, or any other suitable conductive material. The electrodes/contacts may be deposited on top of the LNOI optical waveguide 600 and structured through an etching process. The electrodes/contacts may transmit electrical signals that are used to modulate or encode an optical signal traversing the LNOI optical waveguide 600. The electrical signals may include electrical radio frequency (RF) and microwave signals. Accordingly, the integrated LNOI photonic chip as illustrated in FIG. 8 may be applicable to radio over fiber or microwave over fiber applications. In some examples, the integrated LNOI photonic chip may be embodied in a single chip, such as in a photonic integrated circuit (PIC) and/or be implemented in a planar optical circuit of a semiconductor chip (having electronic integrated circuits and/or electronic components formed therein as well). The integrated LNOI photonic chip may be coupled to an optical fiber (not illustrated). The optical fiber may be an SMF or a lensed fiber. The optical fiber may be aligned in plane with the integrated LNOI photonic chip and coupled to the integrated LNOI photonic chip at an edge of the integrated LNOI photonic chip. Accordingly, the optical fiber may be coupled to the coupler region 320 which extends to the edge of the integrated LNOI photonic chip. In some embodiments, the integrated LNOI photonic chip may integrate a plurality of functionalities with multiple inputs and/or multiple outputs.

Thus, the integrated LNOI photonic chip may be coupled to multiple optical fibers. Given the vertical tapered (LNOI) optical waveguide disclosed herein, the overall optical coupling efficiency between the integrated LNOI photonic chip and an optical fiber may be improved.

Figure 9:
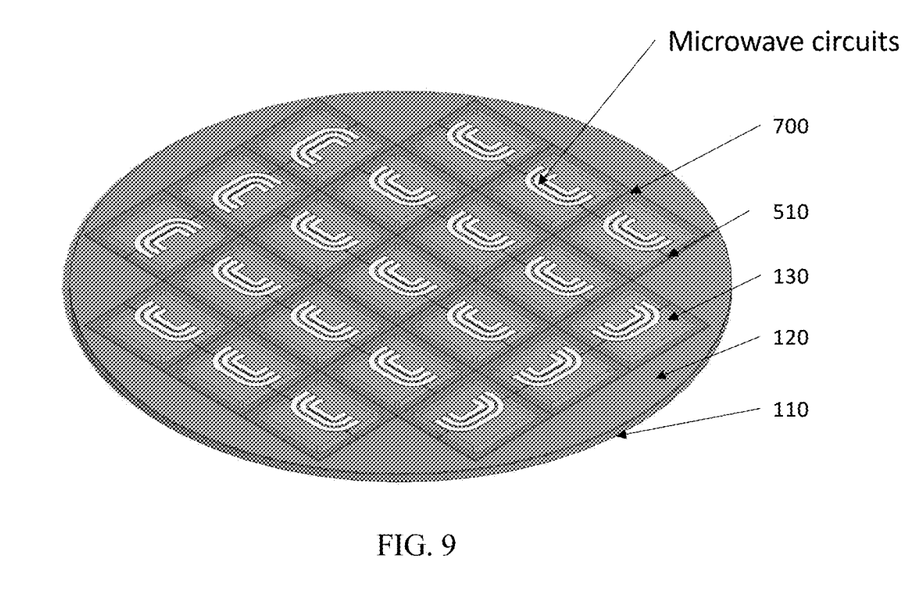
FIG. 9 illustrates a wafer including a plurality of the integrated LNOI photonic chips according to an example embodiment of the inventive concept.

FIG. 9 illustrates a wafer including a plurality of the integrated LNOI photonic chips illustrated in FIG. 8. After forming the integrated LNOI photonic chips on the wafer, a dicing process for cutting the wafer and structures thereon may be performed based on scribe line regions so that the integrated LNOI photonic chips may be divided into individual integrated LNOI photonic chips (i.e., die singulation).

It should be appreciated that the coupler region 320 in the LNOI optical waveguide 600 may represent either an input, output, or both and input and output of the LNOI optical waveguide 600. For example, an optical device may be formed with an interaction region and have two (or more) transition region/waveguide region pairs (e.g., a sequence of an input waveguide coupler region, an input transition region, an interaction region, an output transition region, and an output waveguide coupler region). Such an LNOI optical waveguide may be connected between an input optical fiber and an output optical fiber.

It should be appreciated that alternative processes may be used to manufacture the LNOI optical waveguide 600. For example, in the coupler region 320, the dielectric strip 510 may be formed by a damascene process. For example, in the process of fabricating the LNOI wafer, prior to forming bulk LN on the substrate and a lower cladding layer, a trench may be formed in the lower cladding layer (SiO2, e.g.). Alternatively, an additional layer (e.g., SiO2 or equivalent having appropriate optical refractive index for cladding (i.e., less than that of the core)) may be formed on the lower cladding layer and a trench may be formed in this additional layer formed on the underlying cladding layer. The depth of the trench may be formed to a depth corresponding to the desired thickness of the dielectric strip 510. Then, a layer of LN (or one of silicon nitride, titanium oxide, and silicon) may be deposited to fill the trench, the resulting structure being subjected to a CMP process to planarize the deposited material and expose the trench forming material, leaving a strip of one of silicon nitride, titanium oxide, and silicon in the trench. After forming a thicker LN material (e.g., to the thickness of at least the LN layer 130 in the interaction region 310 as described herein), the process may continue as described herein. It will be appreciated that the CMP process described herein (e.g., with respect to FIGS. 2A and 2B) to form the tapered LN in the transition region 330 may expose the trench forming material while avoiding any significant removal of the dielectric strip 510 previously formed in the trench. For example, the trench forming material may be relatively harder material as compared to LN, or exposure of the trench forming material by the subsequent CMP process may be detected and such detection used to terminate this subsequent CMP process.

It should be appreciated that alternative processes may be used to form the tapered portion of LN layer 130 in the transition region 330. For example, the hard mask 200 may be deposited on the LNOI wafer such that the thickness of the hard mask 200 is constant within the interaction region 310 and the thickness of the hard mask 200 tapers from the edge of the interaction region 310, such that the thickness of the hard mask 200 decreases as the distance from the edge of the interaction region 310 increases. The size of the tapered portion of the hard mask 200 may correspond to the size of the transition region 330. For the LN layer 130 covered by the tapered thickness of the hard mask 200, the rate of removal during the polishing process may vary corresponding to (i.e., as a function of) the thickness of the hard mask 200. For example, as the thickness of the tapered hard mask 200 decreases as the distance from the interaction region 310 increases, the rate of removal of the LN layer 130 increases. Thus, between the interaction region 310 and the coupler region 320, the polishing process may result in a tapered LN material gradually thinning from the interaction region 310 to the coupler region 320 to thereby provide the transition region 330 between the interaction region 310 and the coupler region 320. Accordingly, the LN layer 130 may be vertically tapered, and thus having a vertically tapered surface, in the transition region 330.

The foregoing is illustrative of example aspects of the inventive concept and is not to be construed as limiting thereof. Although a few example aspects of the inventive concept have been described, those skilled in the art will readily appreciate that many modifications are possible in the example aspects without materially departing from the novel teachings and advantages of the present inventive concept. Accordingly, all such modifications are intended to be included within the scope of the present inventive concept as defined in the claims.

What is claimed is:

1. A lithium niobate on insulator (LNOI) optical waveguide comprising:
   a first region, a second region, and a third region;
   a substrate layer extending across the first region, the second region, and the third region;
   a first cladding layer disposed on the substrate layer across the first region, the second region, and the third region;
   a lithium niobate (LN) layer disposed on the first cladding layer across the first region and the second region, wherein the LN layer has a planar surface in the first region and a vertically tapered surface in the second region;
   a dielectric strip in contact with the LN layer across the first region and the second region, and in contact with the first cladding layer across the third region; and
   a second cladding layer disposed on the dielectric strip across the first region, the second region, and the third region,
   wherein the LN layer is not disposed in the third region.

2. The LNOI optical waveguide of claim 1, further comprising:
   a first optical waveguide having a first waveguide core; and
   a second optical waveguide having a second waveguide core, wherein the second waveguide core is different from the first waveguide core.

3. The LNOI optical waveguide of claim 1, wherein the thickness of the LN layer disposed on the first cladding layer across the first region and the second region ranges from 0.1 µm to 0.7 µm.

4. The LNOI optical waveguide of claim 2, wherein first optical waveguide includes the dielectric strip, the LN layer, and the first cladding layer.

5. The LNOI optical waveguide of claim 2, wherein second optical waveguide includes the dielectric strip and the first cladding layer.

6. The LNOI optical waveguide of claim 2, wherein
   the first optical waveguide is a strip-loaded waveguide, and
   the second optical waveguide is a ridge waveguide.

7. The LNOI optical waveguide of claim 2, wherein
the first waveguide core is formed by the LN layer, and
the second waveguide core is formed by the dielectric strip.

8. The LNOI optical waveguide of claim 2, wherein the thickness of the first waveguide core is defined by the thickness of the LN layer and the width of the first waveguide core is defined by the width of the dielectric strip.

9. The LNOI optical waveguide of claim 2, wherein
the first waveguide core and the second waveguide core are configured to guide light in a direction that traverses the first region, the second region, and the third region sequentially.

10. The LNOI optical waveguide of claim 2, wherein
the thickness of the LN layer is a constant first value across the first region,
and the thickness of the LN layer in the second region decreases from a second value that is less than the first value.

11. An optical device comprising:
a lithium niobate on insulator (LNOI) optical waveguide including
a first region, a second region, and a third region,
a substrate layer extending across the first region, the second region, and the third region,
a first cladding layer disposed on the substrate layer across the first region, the second region, and the third region,
a lithium niobate (LN) layer disposed on the first cladding layer across the first region and the second region, wherein the LN layer has a planar surface in the first region and a vertically tapered surface in the second region,
a dielectric strip in contact with the LN layer across the first region and the second region, and in contact with the first cladding layer across the third region, and
a second cladding layer disposed on the dielectric strip across the first region, the second region, and the third region; and
one or more electrodes disposed on the LNOI optical waveguide,
wherein the LN layer is not disposed in the third region.

12. The optical device of claim 11, wherein the LNOI optical waveguide further includes:
a first optical waveguide having a first waveguide core; and
a second optical waveguide having a second waveguide core, wherein the second waveguide core is different from the first waveguide core.

13. The optical device of claim 11, wherein the thickness of the LN layer disposed on the first cladding layer across the first region and the second region ranges from 0.1 μm to 0.7 μm.

14. The optical device of claim 12, wherein first optical waveguide includes the dielectric strip, the LN layer, and the first cladding layer.

15. The optical device of claim 12, wherein second optical waveguide includes the dielectric strip and the first cladding layer.

16. The optical device of claim 12, wherein
the first waveguide core is formed by the LN layer, and
the second waveguide core is formed by the dielectric strip.

17. The optical device of claim 12, wherein the thickness of the first waveguide core is defined by the thickness of the LN layer and the width of the first waveguide core is defined by the width of the dielectric strip.

18. The optical device of claim 12, wherein
the thickness of the LN layer is a constant first value across the first region,
and the thickness of the LN layer in the second region decreases from a second value that is less than the first value.

* * * * *